(12) United States Patent
Alguera Gallego et al.

(10) Patent No.: US 7,207,544 B1
(45) Date of Patent: Apr. 24, 2007

(54) SUPPORTING DEVICE

(75) Inventors: José Manuel Alguera Gallego, Aschaffenburg (DE); Gerald Muller, Obertschausen (DE); Steffen Pfister, Langen (DE)

(73) Assignee: Jost-Werke GmbH & Co. KG (DE)

( * ) Notice: Subject to any disclaimer, the term of this patent is extended or adjusted under 35 U.S.C. 154(b) by 0 days.

(21) Appl. No.: 09/786,041

(22) PCT Filed: Aug. 28, 1999

(86) PCT No.: PCT/EP99/06338

§ 371 (c)(1),
(2), (4) Date: May 14, 2001

(87) PCT Pub. No.: WO00/12364

PCT Pub. Date: Mar. 9, 2000

(30) Foreign Application Priority Data

Aug. 28, 1998 (DE) ................. 198 39 359

(51) Int. Cl.
B60S 9/00 (2006.01)

(52) U.S. Cl. .................... 248/677; 248/615; 280/763.1

(58) Field of Classification Search ............ 248/188.1, 248/188.8, 188.91, 615, 677, 632; 280/763.1, 280/475

See application file for complete search history.

(56) References Cited

U.S. PATENT DOCUMENTS

| | | | | |
|---|---|---|---|---|
| 3,666,290 A | * | 5/1972 | Dalton et al. ............ 280/150.5 |
| 4,462,612 A | * | 7/1984 | Dreyer et al. ............ 280/766.1 |
| 4,824,136 A | * | 4/1989 | Baxter G. Bobby ........ 280/475 |
| 4,863,184 A | * | 9/1989 | Mena .......................... 280/475 |
| 5,054,805 A | * | 10/1991 | Hungerink et al. ......... 280/475 |
| 5,423,518 A | | 6/1995 | Baxter et al. |
| 6,164,697 A | * | 12/2000 | Riggs ...................... 280/763.1 |
| 6,513,783 B1 | * | 2/2003 | Alguera Gallego et al. ........................ 248/677 |

FOREIGN PATENT DOCUMENTS

| | | |
|---|---|---|
| DE | 40 24 825 | 8/1990 |
| DE | 39 21 686 | 1/1991 |
| DE | 42 25 767 | 3/1994 |
| EP | 0 322 634 | 7/1989 |

* cited by examiner

Primary Examiner—Carl D. Friedman
Assistant Examiner—Steven M. Marsh
(74) Attorney, Agent, or Firm—Hudak, Shunk & Farine Co. LPA

(57) ABSTRACT

The invention relates to a supporting device, which comprises a larger clearance for the spindle, whereby the foot receiving device should comprise a high level of stability. The foot-receiving device comprises a component, which occludes the inner sleeve. Said component comprises an opening for admitting the spindle, at least one bracing element located on the upper and/or bottom sides thereof, and two opposing bearing points for the support foot.

20 Claims, 6 Drawing Sheets

SCHNITT A-A

SUPPORTING DEVICE

This invention involves a supporting device for use with a semi-trailer with an outer sleeve and a telescopic (by means of spindle) inner sleeve at whose end is located a foot-receiving device for attachment of a support foot.

BACKGROUND OF THE INVENTION

A support device similar to this is described, for example, in EP 0 322 634 A2 and is illustrated as FIG. 7 and labeled as "Prior Art." FIG. 7 illustrates a semi-trailer 23 having a supporting device 24 which as known to one of ordinary skill in the art includes a support foot 28 attached to an inner sleeve 26 which is expandable and/or retractable in outer sleeve 25 through an actuator, such as crank 27. A component, which sustains a bearing sleeve, is attached, i.e. by welding, at the bottom end of the expandable and/or retractable support element of each support. This component comprises two legs that are angled downward and facing one another. The bearing sleeve is welded to the longitudinal edges of these legs. A rotatable hollow shaft, to which two rolling segments are attached, is supported in the bearing sleeve. The surfaces of the rolling segments allow them to roll off of the footplate when the supports move forward when the semi-trailer is detached.

This foot-receiving device possesses several disadvantages. Due to the fact that the hollow shaft and the bearing sleeve extend over the entire width of the support, the spindle comes into contact with this bearing sleeve when the telescopic inner sleeve is retracted, and the minimum length of the retracted support device is limited by the bearing sleeve.

A further disadvantage is the fact that a dedicated foot-receiving device is required for each support device/support foot combination.

A U-shaped bracket has been developed, which is attached to the inner sleeve using bolts or screws, to create space for the spindle when retracted. This design, however, does not possess adequate stability, thus requiring several plates in some circumstances which must be connected to the inner tube. Consequently, manufacture is rendered more complex, while the space gained for the spindle is only minimal.

The goal of this invention is to create a supporting device which has greater free space for the spindle, with the foot-receiving device simultaneously exhibiting a high degree of stability. In addition, the foot-receiving device must also be appropriate for use with different supporting devices/support feet.

This goal is met by a supporting device whose foot receiving device comprises a component that occludes the inner sleeve and which possesses
- an opening for the spindle penetration,
- at least one bracing element at the top or bottom end, and
- two opposite bearing points for the support foot.

The spindle can penetrate through this opening, whose position has been adapted for the position of the spindle and which can be either centered or eccentric, and through the attachment region of the support foot when the supporting device is retracted without any hindrance. Consequently, the minimum length of the supporting device is defined only by the foot and/or by the cover that is preferably located below the opening. This allows for a compact overall height and, at the same time, a longer spindle. Spindle travel can, for example, be increased by 45–50 mm in this manner.

The pivoting bearing for the support foot, which is normally of a design using a single bolt, is replaced in accordance with this invention by two (2) bearing points located on the side of the penetration opening. Hence, the free space for the spindle is not restricted by the bearing, as these two bearing points do not possess a common component connecting the bearing points.

The bracing element is preferably arranged inside the inner sleeve.

It is advantageous when the bracing element extends at least to between the bearing points in order to enhance the bending section modulus between the bearing points.

The component is designed as a plate, with at least one bracing element designed as a bracing rib. It has been demonstrated that the requisite flexural strength that is guaranteed by through bolts for the current state of the art can be achieved using one or more bracing ribs.

The bracing rib(s) on the top and/or bottom of the plate, which can preferably be made in one piece to follow the contour of the plate, guarantee a high degree of stability and represent a less complex design, without requiring additional components.

To be most advantageous, the bracing rib is arranged in a bow-shape around the opening. To provide symmetry it is also of benefit when at least two (2) bracing ribs are provided on the top and/or bottom of the plate.

Preferably the plate also possesses an edge section located outside the bracing rib for attachment of the inner sleeve. This edge area can be used for example for welding the foot-receiving device onto the end of the inner sleeve. This edge section can be dimensioned such that it is flush with the inner sleeve. It is also feasible that the width of the edge section be somewhat larger, allowing inner sleeves of differing diameters to be attached to the section so that the foot-receiving device can be used universally.

Preferably the bearing point is arranged on the plate plane, allowing a high level of stability to be achieved, in particular when bracing ribs are located above and below the plate.

Based on a further design, with the component in the form of a plate, provision is made for a circumferential bracing rib arranged on the top of the plate, which engages with positive locking in the inner sleeve, and a circumferential rib on the bottom, which becomes an end part that acts as a cover. Fitting of the bracing rib in the inner sleeve results in an extended attachment area and, hence, in enhanced overall stability of the foot-receiving device. Also contributing to this enhanced stability is the circumferential bracing rib on the bottom, which also becomes a bottom part over the transition section if required.

The foot-receiving device preferably comprises two (2) halves, which can be laterally reversed and preferably welded together prior to installation. This two-half design offers advantages with regard to manufacturing.

Based on a further design, the component is in the form of a vertically arranged tube whose outside diameter in at least one upper section is less than or equal to the inside diameter of the inner sleeve. This design has the advantage that the tube wall simultaneously forms the top and bottom-bracing element. Here, the inside of the tube forms the opening for the spindle. This provides for a particularly simple foot-receiving device.

Preferably the tube is a rectangular tube.

The tube can be inserted easily into the inner sleeve when the outer diameter is equal to the inside diameter of the inner sleeve, with a larger contact area available for welding with the inner sleeve.

The bearing points are preferably attached on the outside, in particular on the outside of the tube. As loading of the supporting device is exerted at the lowest point of the supporting device, it is advantageous when the bearing points are arranged at the widest space possible.

The opening for the spindle can be closed off by a cover mounted at the bottom of the component in order to provide splash-proofing for the spindle. This cover may either be an integral element of the component, or can be bolted on, for example, as a separate item.

The foot-receiving device permits a modular supporting device design by allowing different types of support feet to be mounted, without requiring complicated refitting measures.

BRIEF DESCRIPTION OF THE DRAWINGS

A foot-receiving device 1 is shown in FIG. 1 that is arranged at the bottom of the inner sleeve 8 of a supporting device. The spindle 11 is located on the inside of the inner sleeve. The spindle is connected to gearing (not shown) arranged in the top section of the supporting device in order to extend the inner sleeve 8. FIG. 1 shows the situation with the inner sleeve 8 retracted. The corresponding outer sleeve is likewise not shown.

Figure 1:
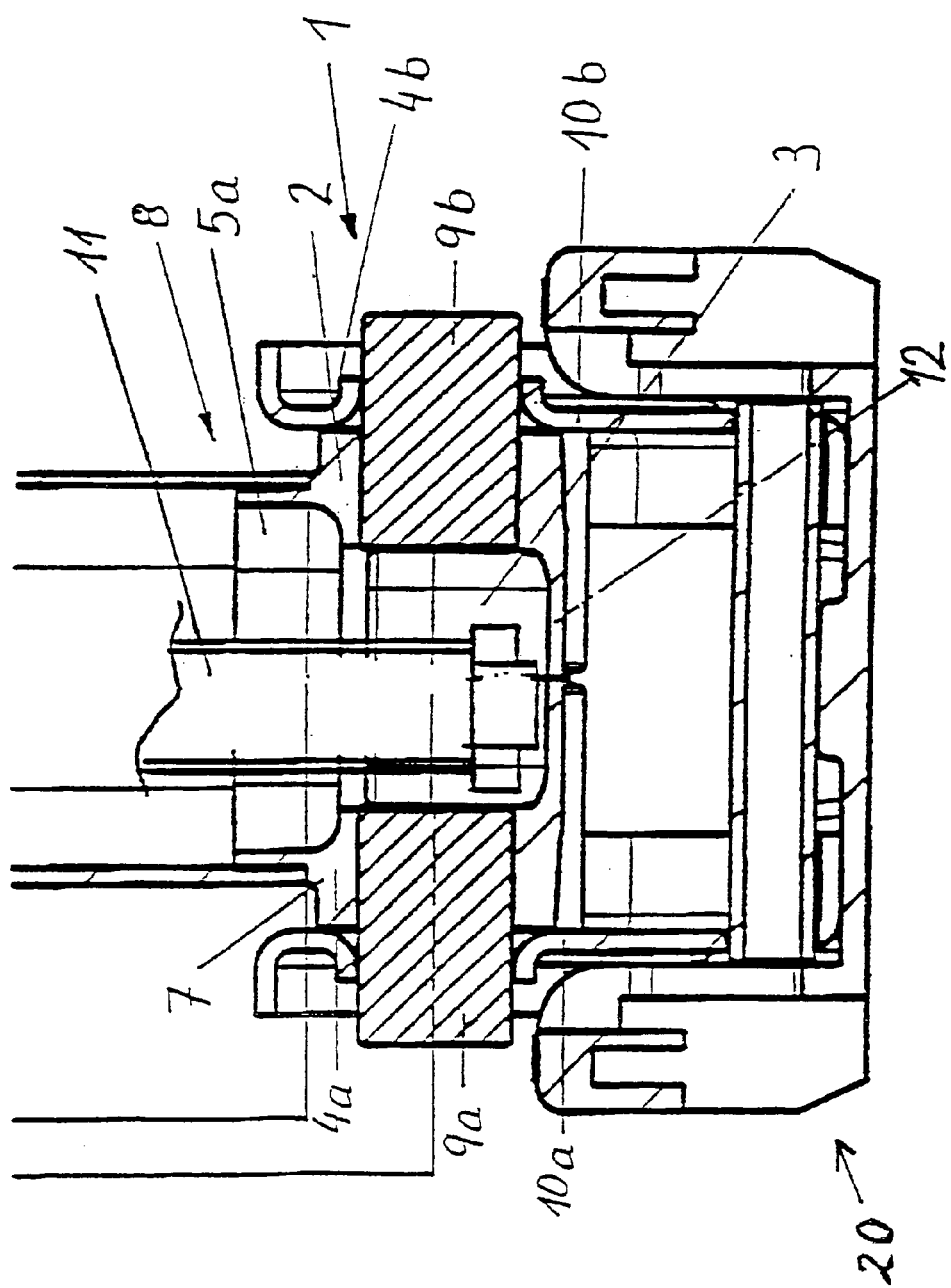
FIG. 1 a vertical section through the foot receiving device.

The foot-receiving device 1 possesses a plate 2 provided with an opening 3 through which the spindle 11 extends downward. On the inside of the inner sleeve 8 the plate 2 is fitted with two (2) symmetrical bracing ribs, of which only bracing rib 5a is visible, which extend around the opening 3 between the bearing points 4a, b. No further bracing ribs are provided on the bottom. A cover 12 is located at the bottom in order to close off the opening 3 and to protect the spindle 11 against splash water. This cover 12 may be a separate part, or may be an integral part of the plate 2.

Two (2) opposing bearing points 4a and 4b are arranged adjacent to the opening 3. Two (2) bolts 9a and 9b, which support the two flanges 10a and 10b for the support foot 21 (also not shown in detail), are supported in these bearing points.

Figure 2:
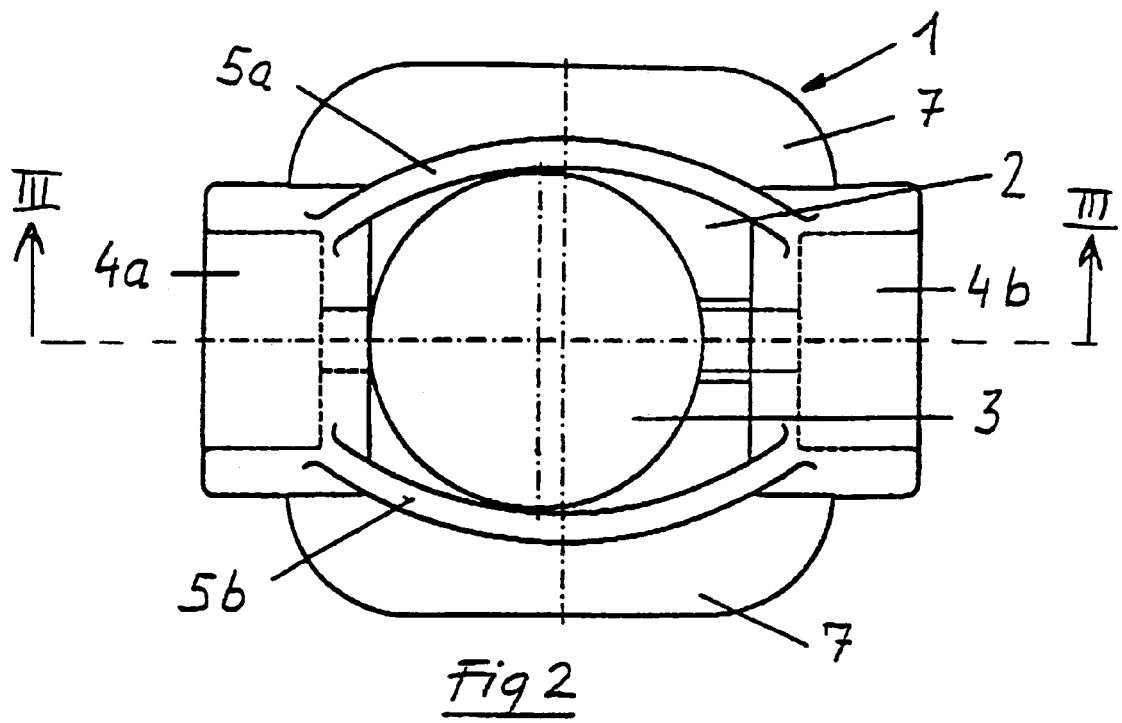
FIGS. 2, 3 and 4 a top view, a section through and a side view of the foot-receiving device, FIG. 5a, b perspective view and cross-section view of a further design FIG. 6a, b cross section and top view of a further design FIG. 6c the design shown in FIG. 6a, b, when installed.

FIG. 2 presents a top view of the foot-receiving device 1.

The opening 3 is arranged slightly eccentrically in the plate 2. The opening 3 is bordered on the sides by the two curved bracing ribs 5a and 5b, which extend into the region of the bearing points 4a and 4b. The edge section 7 of the foot-receiving device is located outside of the bracing ribs 5a and 5b. The inner sleeve is welded to the edge section 7. The dimensions for the edge section 7 for the design presented here (FIG. 1) have been adapted to the dimensions for the inner sleeve 8 so that the edge section 7 is flush with the inner sleeve.

Figure 3:
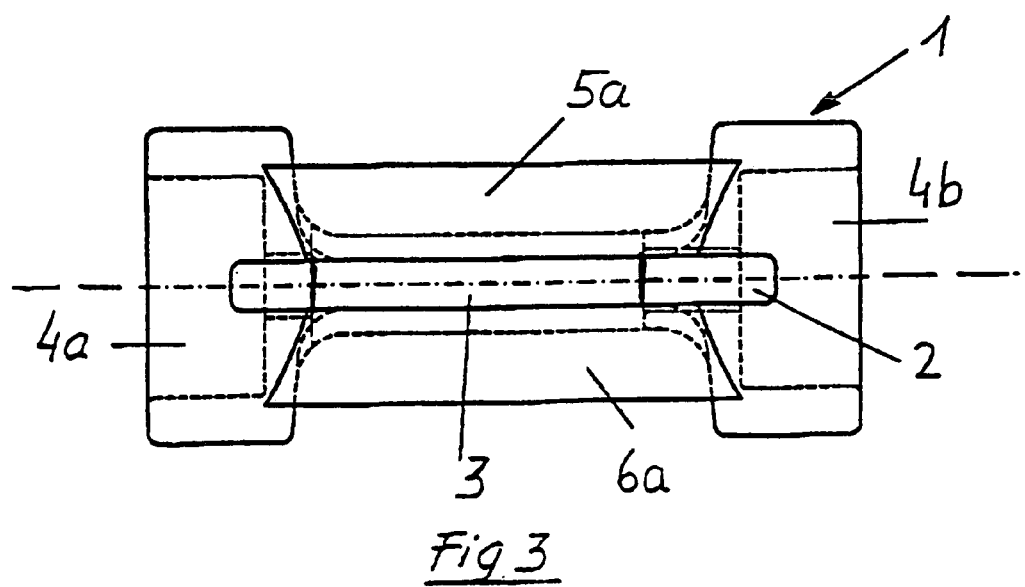

A longitudinal section along the line III—III in FIG. 2 through the foot-receiving device 1 is shown in FIG. 3. In addition to bracing ribs 5a and 5b, two (2) further bracing ribs are provided at the bottom, of which bracing rib 6a is visible. Similar to the top bracing ribs 5a and 5b, bracing ribs 6a and 6b are also curved.

Figure 4:
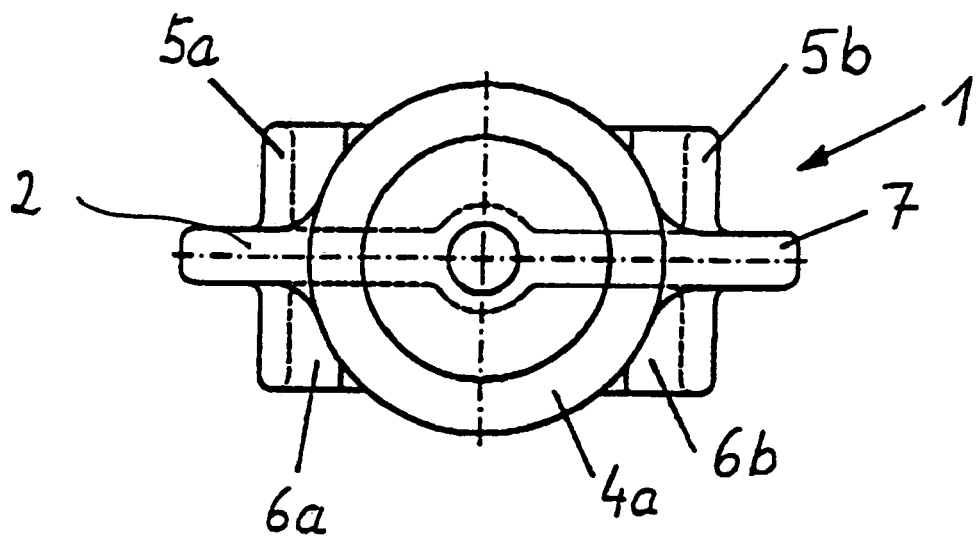

FIG. 4 shows a side view, which clearly illustrates the bearing points 4a and 4b located on the plane of the plate 2.

Figure 5A:
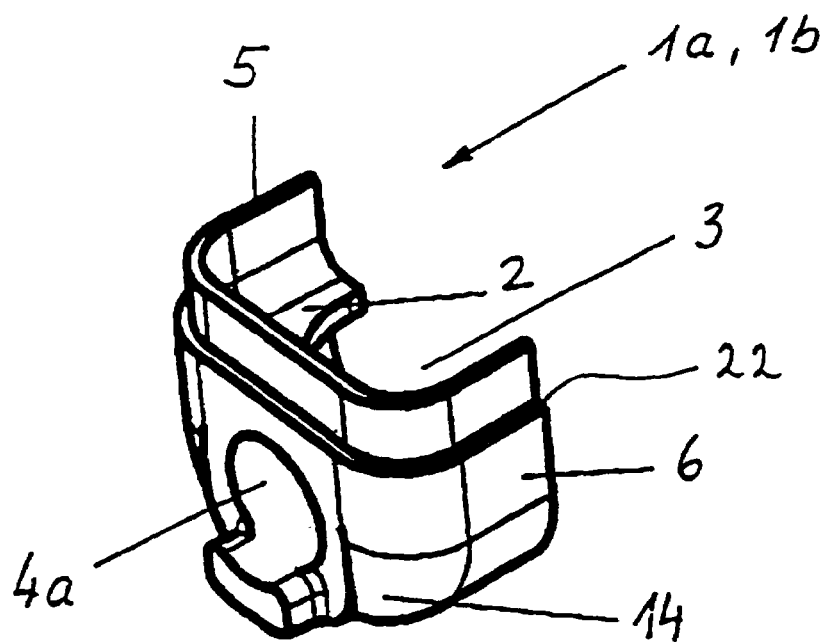
Figure 5B:
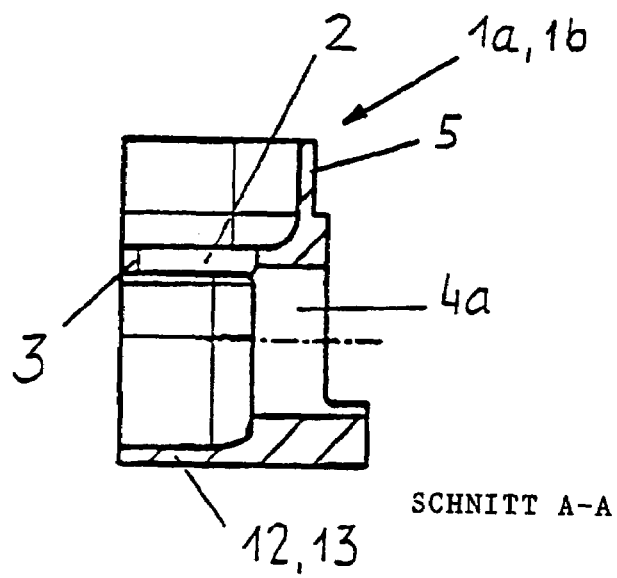

A further design is shown in FIGS. 5a and 5b. The foot receiving device consists of two (2) laterally reversed halves 1a and 1b, with only one half 1a and 1b shown in the corresponding FIGS. 5a and 5b. Likewise, only half of the circumferential rib 5 on the top of plate 2 is shown. The outside diameter of this circumferential rib 5 corresponds to the inside diameter of the inner sleeve 8, such that the bracing rib 5 is in contact with the inner sleeve. This bracing rib extends downward as a shoulder 22, which lies against the end of the inner sleeve. A circumferential bracing rib 6 is also arranged below plate 2. As shown in FIG. 5, this rib extends over an arched section 14 and then forms a bottom part 13. This bottom part 13 is arranged below the opening 3 and prevents the ingress of splash water.

Bearing point 4a, with an opening for accommodating the bolt for the pivot bearing for a foot, is set in the bottom bracing rib 6.

Figure 6A:
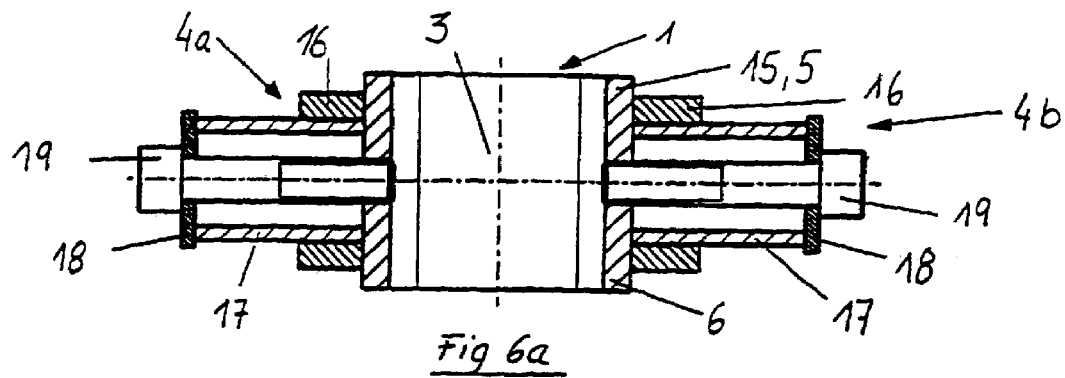
Figure 6B:
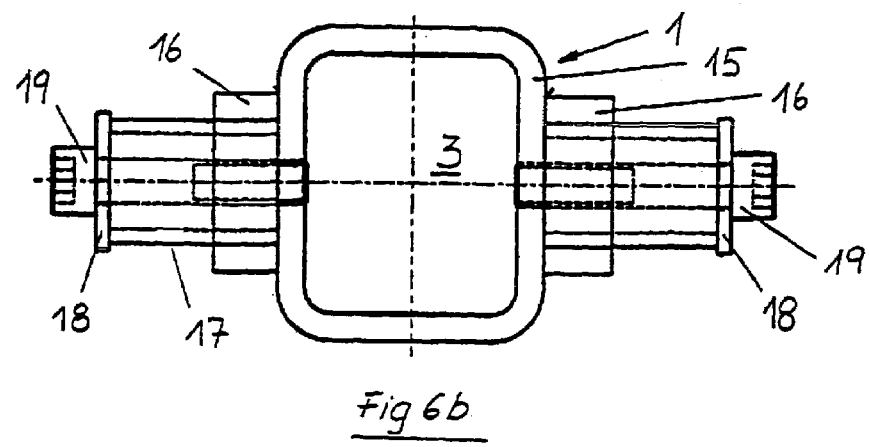
Figure 7:
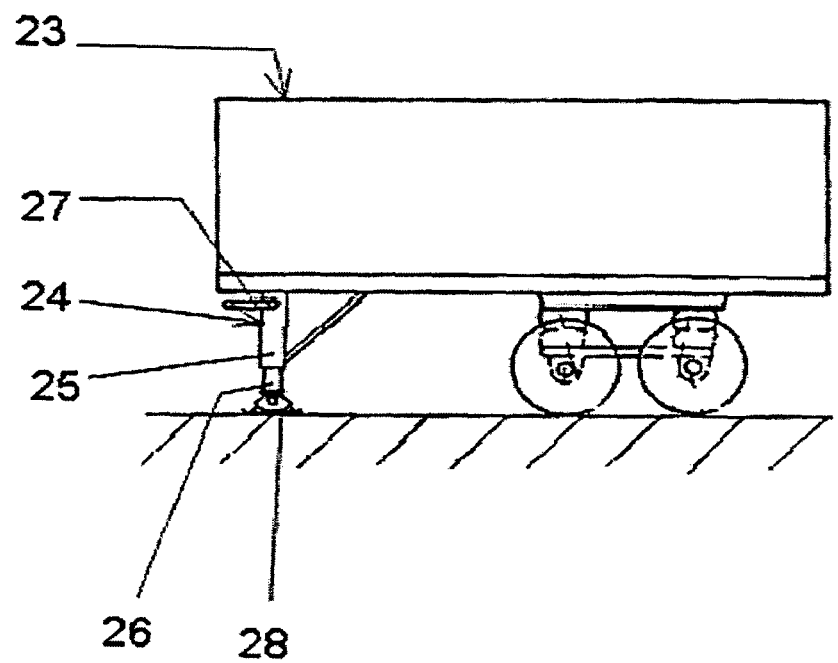
FIG. 7 is a perspective view of a prior art support device including an outer sleeve, an inner sleeve which is extendable and/or retractable in the outer sleeve through a crank, and a support foot attached to the inner sleeve, with the outer sleeve of the support device connected to a semi-trailer.

A further design for the foot-receiving device 1 is shown in FIGS. 6a and 6b. The component consists of a tube 15, which, as shown in FIG. 6b, is in the form of a rectangular tube. The inside of the rectangular tube 15 forms the penetration opening 3, while the tube wall simultaneously assumes the function of the top bracing rib 5 and the bottom bracing rib 6. Bearing points 4a and 4b are formed by the bearing tube sections 16 on the outside of the tube, into which two (2) further bearing tube sections 17 are fitted and which are held by a disk plate 18 and a bolt 19 that is screwed into the tube 15.

FIG. 6c shows the designs illustrated in FIGS. 6a and 6b when they are installed. A cover plate 12 is additionally arranged at the bottom of the tube. The inner sleeve 8 is welded on to the first bearing tube section 16. A support foot 20 is shown with foot plate 21 and foot flanges 10a and 10b, with foot flanges 10a and 10b supported on the second bearing tube section 17 so as to allow them to pivot.

LEGEND

1 Foot-receiving device
1a, b Halves
2 Plate
3 Opening
4a, b Bearing point
5, 5a, b Top bracing rib
6, 6a, b Bottom bracing rib
7 Edge section
8 Inner sleeve
9a, b Bolt
10a, b Foot flange
11 Spindle
12 Cover
13 Bottom part
14 Arched section
15 Tube
16 First bearing tube section
17 Second bearing tube section
18 Disk plate
19 Screw
20 Support foot
21 Foot plate
22 Shoulder

The invention claimed is:

1. A supporting device for semi-trailers comprising:
an outer sleeve a telescopic inner sleeve;
the spindle for a telescopic inner sleeve; and
a foot-receiving device for attaching a support foot, the foot receiving device connected to a bottom end of the inner sleeve, the foot-receiving device comprising:
a component comprising a plate that occludes the inner sleeve;
an opening in the component plate for penetration of the spindle past a lower end of the inner sleeve;
at least one bracing element at a top or bottom end of the foot-receiving device; and
two opposing bearing points adapted to accommodate the support foot.

2. The supporting device according to claim 1, wherein the bracing element is arranged within the inner sleeve.

3. The supporting device according to claim 1, wherein the bracing element extends at least between the bearing points.

4. The supporting device according to claim 1, wherein the bracing element is a bracing rib.

5. The supporting device according to claim 1, wherein the bracing element is a bracing rib which has a curved shape and is located around the opening.

6. The supporting device according to claim 1, wherein the component is said plate having an edge section located outside of the bracing element which is a bracing rib for attachment of the inner sleeve.

7. The supporting device according to claim 1, wherein the bearing points are arranged on a plane of the component which is said plate.

8. The supporting device according to claim 1, wherein the bracing element is a circumferential bracing rib, which engages the inner sleeve in a forced fit, is arranged on the top of the component which is said plate and forms a bottom part that constitutes a cover at the bottom of the circumferential bracing rib.

9. A supporting device according to claim 8, wherein the foot receiving device consists of two laterally reversed halves.

10. A supporting device according to claim 1, wherein the component comprises a vertically arranged tube whose outside diameter is less than or equal to the inside diameter of the inner sleeve in at least one section.

11. A supporting device according to claim 10, wherein the tube is a rectangular tube.

12. A supporting device according to claim 10, wherein the bearing points are attached to the outer surface of the tube.

13. A supporting device according to claim 1, wherein the opening is closed off by a cover.

14. The supporting device according to claim 2, wherein the bracing element extends at least between the bearing points.

15. The supporting device according to claim 14, wherein the component is said plate and the bracing element is a bracing rib.

16. The supporting device according to claim 15, wherein the bracing rib has a curved shape and is located around the opening.

17. The supporting device according to claim 16, wherein the plate has an edge section located outside of the bracing rib for attachment of the inner sleeve.

18. The supporting device according to claim 17, wherein the bearing points are arranged on the plate plane.

19. The supporting device according to claim 18, wherein a circumferential bracing rib, which engages the inner sleeve in a forced fit, is arranged on the top of the plate and forms a bottom part that constitutes a cover at the bottom of the circumferential bracing rib.

20. A supporting device according to claim 19, wherein the foot receiving device consists of two laterally reversed halves.

* * * * *